Patented Oct. 1, 1946

2,408,402

UNITED STATES PATENT OFFICE 2,408,402

TRICHLOROETHYLENE COPOLYMERS

Harold Wilfred Arnold, Marshallton, Del., assignor to E. I. du Pont de Nemours & Company, Wilmington, Del., a corporation of Delaware No Drawing. Application January 3, 1941, Serial No. 373,036

1 Claim. (Cl. 260—84)

This invention relates to polymers and more particularly to copolymers of unsaturated organic compounds.

While compounds of the type

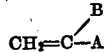

where A is hydrogen or halogen and B is halogen are readily polymerizable and interpolymerizable under the influence of mild heat and/or oxygen-yielding catalysts, related compounds wherein one of the methylene (CH$_2$) hydrogens is replaced by halogen do not readily polymerize and require quite drastic conditions to form even dimers or trimers. Since trichloroethylene is an available material, it is desirable for economic reasons to produce copolymers thereof. There has been no indication hitherto that trichloroethylene could be copolymerized with polymerizable organic compounds having conjugate unsaturation and in fact it would be inferred from the prior art that such copolymerization does not occur.

This invention has as an object the provision of a process for preparing copolymers of trichloroethylene with polymerizable organic compounds having conjugate unsaturation. A further object includes the copolymers. Other objects will appear hereinafter.

These objects are accomplished by the following invention of copolymers of trichloroethylene with a polymerizable organic compound having an ethylenic double bond conjugated with a multiple bond between carbon and an element of groups IV to VI and of the first full series of the periodic system, i. e., an element of atomic weight between 12 and 16, i. e., carbon, nitrogen or oxygen, the copolymer containing not more than 25%, by weight of the copolymer, of trichloroethylene.

In the preferred practice of this invention, a mixture of trichloroethylene and at least an equal weight of a polymerizable organic compound having an ethylenic double bond conjugated with a multiple bond between carbon and an element of atomic weight from 12 to 16, is emulsified in an aqueous medium containing 1 to 3% of an emulsifying or dispersing agent and 0.1 to 2% of a water-soluble oxygen-liberating polymerization catalyst such as hydrogen peroxide, ammonium persulfate, and the like. The emulsion is agitated, preferably in an oxygen-free atmosphere, at a constant temperature in the range of about 60 to 100° C. Depending upon the monomer combination and the conditions used, the polymerization may be discontinued as essentially complete after about 2 hours to approximately two days. The progress of polymerization may be determined by one of two methods: (1) periodic determination of specific gravity, and (2) periodic precipitation of small aliquot portions of the emulsion to determine the amount of polymer therein.

After polymerization is discontinued the emulsion is steam distilled to remove residual monomer. It is then diluted with an approximately equal volume of water, and precipitated by the addition with rapid stirring of a solution of an electrolyte such as aluminum sulfate, calcium chloride, sodium chloride, sulfuric acid, phosphoric acid, hydrochloric acid or the like. The precipitated polymer is filtered off, washed thoroughly with water until all traces of electrolyte and dispersing agent are removed, and dried. It may happen that the addition of the electrolyte causes the precipitation of the polymer in so finely divided a form that filtration is difficult. This difficulty can ordinarily be overcome by heating the mixture either before or after the addition of the electrolyte. To facilitate drying, the polymer may, if desired, be given a final wash with a low boiling water-miscible organic liquid which is not a solvent for the polymer. Lower aliphatic alcohols or mixtures of these with small percentages of aromatic hydrocarbons are suitable for this purpose. For the separation of the polymer, the process known as "freezing" can be used.

For certain applications such as coating or impregnating fibrous materials, it may be preferable to use the dispersion obtained in the polymerization step without isolation of the polymer. If the dispersion is to be used for such a purpose, it is necessary merely to remove residual monomer by a steam distillation. The dispersion may be thickened if desired by the addition of a water-soluble polymer such as polyvinyl alcohol or sodium polyacrylate or methacrylate.

The more detailed practice of the invention is illustrated by the following examples, wherein parts given are by weight. There are of course many forms of the invention other than these specific embodiments.

Example I

A mixture consisting of 40 parts of methyl methacrylate and 10 parts of trichloroethylene is emulsified by vigorous agitation in 100 parts of an aqueous solution containing 2 parts of the sodium salt of cetylsulfuric acid and 0.5 part of ammonium persulfate, the pH of which aqueous solution has been adjusted to 7 by the addition of disodium phosphate solution. The air in the polymerization vessel is displaced by carbon dioxide prior to the emulsification. The emulsion is heated with occasional agitation at a temperature of 65° C. for a period of 90 hours. At the end of this time the emulsion is steam distilled, diluted with an equal volume of water, and treated with 10 parts of a 10% solution of aluminum sulfate in water. The polymer thus precipitated is washed four times with water and once with methanol, and then air dried. A good yield of white, thermoplastic powder is obtained. This can be molded under pressure at temperatures above approximately 120° C. The resulting moldings are clear, virtually colorless, and hard. The polymer is readily soluble in toluene. The chlorine content is 11.25% indicating a 13.8% trichloroethylene content in the polymer.

*Example II*

A mixture of 40 parts of styrene and 10 parts of trichloroethylene is polymerized exactly as in Example I and produces a good yield of thermoplastic polymer which forms a very fluid melt when heated above its softening temperature. The chlorine content is 8.67% indicating a trichloroethylene content of 10.6%.

*Example III*

A mixture of 60 parts of methyl acrylate and 40 parts of trichloroethylene containing 2 parts of benzoyl peroxide is heated under reflux at 80° C. for a total of 5.5 hours. At the end of this time, the material is subjected to distillation to remove unchanged monomer leaving as a residue 54 parts of polymer in the form of a clear, light-yellow, soft, flexible mass which is suitable for the preparation of coating and adhesive compositions. The chlorine content is 9.36% indicating 11.5% trichloroethylene.

*Example IV*

A mixture consisting of 60 parts of methyl alphachloroacrylate, 40 parts of trichloroethylene, and 2 parts of benzoyl peroxide is heated under reflux at a temperature of 85° C. for 7 hours, then vacuum distilled to remove unchanged monomer, leaving 52 parts of a clear, virtually colorless hard mass. The chlorine content is 36.13% indicating 12.9% of trichloroethylene. A molding of this material becomes pliable at 99° C. when immersed in a heated oil bath.

*Example V*

A mixture of 60 parts of chloroprene, 40 parts of trichloroethylene and 2 parts of benzoyl peroxide is heated under reflux at 85° C. for a total of 7 hours and the mixture is then distilled to remove unchanged monomer. The residue, which amounts to 60 parts, is a dark brown, rubbery mass, capable of being vulcanized and contains considerable combined trichloroethylene.

*Example VI*

A mixture of 60 parts of methyl alpha-chloroacrylate, 20 parts of trichloroethylene, and 0.16 part of benzoyl peroxide is added to 200 parts of a 0.1% solution of sodium starch glycolate in water at an initial temperature of 65° C. The mixture is rapidly agitated in a reflux vessel and the temperature quickly raised to 85° C. and maintained at this point for approximately 1 hour. At the end of this time heating is discontinued and the mixture is cooled while agitation is maintained. The mixture is filtered through cloth, washed very thoroughly 8 times with water, and dried at 75° C. Approximately 60 parts of a granular product is obtained. This can be molded to a light amber, hard chip which became flexible at approximately 105° C. when immersed in a heated oil bath. The chlorine content (Carius) is 33.20% indicating a trichloroethylene content of 7.3%.

*Example VII*

A mixture consisting of 60 parts of methyl vinyl ketone, 40 parts of trichloroethylene, and 2 parts of benzoyl peroxide is heated under reflux at a temperature of 80° C. for a total of 5.5 hours, then distilled to remove monomer, leaving 52 parts of product in the form of a dark brown, somewhat brittle solid, soluble in solvents such as toluene, acetone, and dioxan. The chlorine content is 4.78% indicating a trichloroethylene content of 5.9%.

*Example VIII*

A mixture of 60 parts of acrylonitrile and 40 parts of trichloroethylene is emulsified in 100 parts of an aqueous solution containing 2 parts of the sodium salt of cetylsulfuric acid and 0.5 part of ammonium persulfate. The polymerization vessel is flushed out with nitrogen and the mixture then heated at 40° C. with intermittent agitation for a total of 92 hours. The polymer is isolated as in Example I. The chlorine content is 2.02% indicating approximately 2.3% trichloroethylene.

Trichloroethylene may be polymerized in the process of this invention with an at least equal weight of any polymerizable organic compound having ethylenic unsaturation conjugated with a multiple bond between carbon and an element of group IV to VI inclusive and of the first full period of the periodic system including the methyl, ethyl, butyl, octyl, octadecyl, cyclohexyl, phenyl, beta-chloroethyl, etc., esters of acrylic, methacrylic and alpha-chloroacrylic acids, styrene, vinylnaphthalene, methyl vinyl ketone, methyl isopropenyl ketone, acrylonitrile, methacrylonitrile, butadiene, chloroprene, isoprene, and the like.

The extent to which trichloroethylene will interpolymerize with compounds having ethylenic unsaturation conjugated with another multiple bond is dependent very largely on the conditions used and on the type of monomer with which it is being interpolymerized. In any combination involving trichloroethylene the amount of trichloroethylene introduced into the polymer is generally less than the concentration of trichloroethylene in the initial monomer mixture before polymerization. The difference between these two values is influenced by the initial concentration of trichloroethylene. If this initial concentration is high, say approximately 40%, the difference between the initial trichloroethylene concentration and the percentage actually included in the polymer may be quite marked, while if the initial concentration is low the difference may be insignificant. The difference also depends to a considerable extent upon the monomeric material with which trichloroethylene is being interpolymerized. With actively polymerizing materials such as methyl methacrylate and methyl alpha-chloroacrylate the difference is less than that observed in the case of the more slowly polymerizing compounds such as styrene or acrylonitrile. The extent to which trichloroethylene interpolymerizes is also influenced by the catalyst concentration and temperature. In general high catalyst concentrations and high temperatures favor the introduction of larger quantities of trichloroethylene. In the case of emulsion copolymerization, the pH may also perceptibly affect the extent to which trichloroethylene will copolymerize.

In the application of the emulsion method to the copolymerization of trichloroethylene with compounds having ethylenic unsaturation conjugated with another multiple bond it is possible to use any of a large variety of long chain dispersing agents known to the art.

These include the alkali metal, ammonium, and amine salts of fatty acids as exemplified by such compounds as sodium, potassium, or ammonium palmitate and the mono-, di-, or triethanolamine salts of lauric or palmitic acids; quaternary amine salts such as lauryltrimethylammonium bromide and octadecyltrimethylammonium bromide; the sodium, potassium, or ammonium salts of long chain alkyl sulfuric esters such as sodium dodecylsulfate, sodium cetylsulfate, sodium octadecenylsulfate, sodium acetoxyoctadecylsulfate, and the like; sodium, potassium, ammonium, or amine salts of true sulfonic acids such as alkyl naphthalene sulfonic acids, cetyl sulfonic acid and alpha-acetoxyoctadecanesulfonic acids; betaine derivatives such as C-cetylbetaine and hydroxypropyl-C-cetylbetaine.

Any one of a number of oxygen-yielding polymerization catalysts may be used. These include hydrogen peroxide, alkali and ammonium perborates, alkali and ammonium persulfates, alkali and ammonium peracetates, alkali and ammonium perchlorates, peracetic acid, and persulfuric acid. These catalysts are all water miscible and are preferably used in aqueous systems as exemplified by the emulsions and granular processes. In polymerizations carried out in nonaqueous media it is preferable to use organic peroxides such as acetyl benzoyl peroxide, benzoyl peroxide, dibutyryl peroxide, lauroyl peroxide, succinyl peroxide, urea peroxide, and decahydronaphthalene peroxide. Such catalysts may also be used in systems involving aqueous media.

When polymerization is to be carried out by the emulsion process, initial emulsification of the monomer mixture in the dispersing or emulsifying agent may be accomplished by simple stirring or agitation as by shaking or tumbling or through the use of a so-called turbulent flow mixer. Once the emulsion is formed it is frequently not necessary to agitate it during the course of the polymerization although in most cases it will be preferable to employ either intermittent or continuous agitation.

In addition to the use of the emulsion process other methods may be used. These include bulk methods in which the mixture of components is polymerized without added diluents, and the solution method which involves polymerization in a solvent which dissolves the monomers and which may or may not act as a solvent for the polymer. Suitable solvents include aliphatic hydrocarbons, aliphatic alcohols, aromatic hydrocarbons, ketones, esters, dioxan, ethers, saturated chlorinated hydrocarbons, and the like.

The so-called "granular" method may also be used. This involves rapidly agitating the monomer mixture containing a small percentage of a peroxidic polymerization catalyst with an aqueous solution containing a small percentage (up to about 5%) of a protective colloid of the type of soluble starch, methyl starch, partially hydrolyzed polyvinyl acetate, alkali salts of polymers or interpolymers containing acrylic or methacrylic acids, polymethacrlyamide, sodium starch glycolate, sodium cellulose glycolate, etc., in a vessel equipped with a reflux condenser at such temperatures that moderate reflux is maintained. The polymerization may, if desired, be conducted at higher temperatures in a closed vessel. Under these conditions the monomer is dispersed in the form of small droplets which solidify as polymerization proceeds to give the polymer in the form of small granules or globules. These remain suspended in the aqueous medium so long as rapid agitation is maintained but settle out rapidly when agitation is suspended. The granules are readily filtered from the mixture, washed free of occluded protective colloid, and dried.

Regardless of the method employed, it is advantageous to displace air from the polymerization vessel and to replace it with a gas which does not adversely influence the course of polymerization. Such a gas is nitrogen, carbon dioxide, or helium. If desired, traces of air may also be eliminated by the use of a vacuum. The polymerization may also be accelerated by the use of high pressures of the order of 100 to 1000 atmospheres.

Whatever the system of polymerization employed, the initial concentration of trichloroethylene should not exceed 50% by weight. Higher percentages unduly prolong the polymerization cycle without increasing greatly the amount of trichloroethylene combined in the final copolymer and yield lower molecular weight polymers.

Certain copolymers especially those which contain relatively high proportions, i. e., 10% or over of combined trichloroethylene may be susceptible to thermal decomposition. This decomposition may be greatly minimized by the addition of small percentages of certain stabilizing agents such as organic or inorganic alkali metal compounds which show a basic reaction, compounds containing the ethylene oxide ring such as epichlorohydrin, 1 - phenoxy-2,3-ethoxy propane, and the like, or compounds containing the thiol group, such as thio-beta-naphthol.

The copolymers herein described are useful in the preparation of plastics, coatings, and adhesives. Copolymers containing more than 25% trichloroethylene have a poorer tensile strength, are more brittle, and have inferior heat and light stability as compared with copdlymers containing up to 25% trichloroethylene. For any of these purposes the copolymers may be combined with or prepared in the presence of plasticizers, stabilizers, fillers, pigments, dyes, softeners, natural resins, or other synthetic resins. Specific surfaces to which coatings and impregnating compositions containing these copolymers may be applied include wood, textile, leather, metals, glass, paper, stone, brick, concrete, plaster, and the like.

The above description and examples are intended to be illustrative only. Any modification of or variation ttherefrom which conforms to the spirit of the invention is intended to be included within the scope of the claim.

What is claimed is:

A copolymer of trichloroethylene and methyl methacrylate containing approximately 13.8% trichloroethylene and approximately 86.2% methyl methacrylate.

HAROLD WILFRED ARNOLD.